(12) United States Patent
Cheng et al.

(10) Patent No.: US 7,281,932 B2
(45) Date of Patent: Oct. 16, 2007

(54) GROUND WIRE CONNECTOR

(75) Inventors: Ming Cheng, Memphis, TN (US); George Robertson, Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/411,264

(22) Filed: Apr. 26, 2006

(65) Prior Publication Data

US 2006/0237210 A1    Oct. 26, 2006

Related U.S. Application Data

(60) Provisional application No. 60/674,865, filed on Apr. 26, 2005.

(51) Int. Cl.
    *H01R 4/66* (2006.01)
(52) U.S. Cl. ....................................... 439/100
(58) Field of Classification Search ................ 439/100, 439/101, 92, 799, 98; 174/51
    See application file for complete search history.

(56) References Cited

U.S. PATENT DOCUMENTS

| 1,793,911 | A | * | 2/1931 | Dann ......................... 439/777 |
|---|---|---|---|---|
| 2,260,136 | A | | 10/1941 | Bergan |
| 2,974,185 | A | | 3/1961 | Curtiss |
| 3,365,693 | A | * | 1/1968 | Browne ....................... 439/100 |
| 3,448,430 | A | * | 6/1969 | Kelly ........................... 439/610 |
| 3,492,625 | A | | 1/1970 | Bromberg |
| 3,967,872 | A | | 7/1976 | Mooney et al. |
| 4,159,859 | A | | 7/1979 | Shemtov |
| 4,248,490 | A | * | 2/1981 | Bachle ......................... 439/98 |
| 4,355,852 | A | * | 10/1982 | Bachle ......................... 439/92 |
| 4,806,108 | A | | 2/1989 | Meinhardt |
| 5,929,383 | A | | 7/1999 | Marik et al. |
| 5,967,805 | A | * | 10/1999 | Auclair et al. ............... 439/100 |

* cited by examiner

*Primary Examiner*—Neil Abrams
*Assistant Examiner*—Phuongchi Nguyen
(74) *Attorney, Agent, or Firm*—Hoffmann & Baron, LLP

(57) ABSTRACT

This invention pertains to a ground connector for grounding a conduit to an enclosure. The ground connector includes a plurality of integral ears extending from an outer wall of the connector with these ears configured to receive a ground wire therein. A locking nut portion, when engaged with the connector, urges the ground wire against the ears to thereby mechanically and electrically secure the ground wire to the ground connector. The connector is further configured with a plurality of locking teeth that engage the enclosure to thereby at least mechanically (and preferably electrically) secure the connector to the enclosure.

20 Claims, 6 Drawing Sheets

GROUND WIRE CONNECTOR

CROSS-REFERENCE TO RELATED APPLICATION

This application claims priority to U.S. Provisional Patent Application No. 60/674,865, filed on Apr. 26, 2005, which is incorporated herein by reference.

FIELD OF THE INVENTION

This invention pertains in general to grounding connectors for use in load centers or other electrical enclosures to which metal conduit is connected and more particularly to a grounding bushing whose ground wire connection can be made regardless of the orientation of the bushing within the enclosure.

BACKGROUND OF THE INVENTION

Local and national electric building codes require there to be a ground connection between electrical conduits and an enclosure such as a load center or the like. Such codes require this grounding path to be permanent and electrically continuous. Thus, to comply with such requirements, it is common for the installer to employ a secondary ground conductor or wire between these devices rather than rely solely upon the connection to the enclosure.

To satisfy this requirement, many different types of grounding connectors have been designed that secure a ground wire between a load center/enclosure and a metal conduit. Examples of such devices are shown in U.S. Pat. No. 2,974,185, U.S. Pat. No. 3,492,625, U.S. Pat. No. 4,159,859 and U.S. Pat. No. 4,806,108.

The earlier '185 patent shows a grounding bushing having only two locations at which a ground wire connection can be made. This can be problematic if either of these two ground wire connecting locations end up being inaccessible due to the limited space within the load center/enclosure. The '625 patent improves upon this earlier patent by providing a grounding bushing having three such locations where a ground wire can be secured thereto. The '108 patent improves upon these former patents even further by providing a multitude of different locations where the ground wire connection can occur. The '859 patent is unique in that not only does it show a multitude of different locations where the ground wire can be attached to the grounding bushing, but this patent also discloses a separate cable connector member 12 that can be rotated about its connection to the grounding bushing. This provides even more options for the installer to make the ground wire connection within the tight confines of the enclosure.

U.S. Pat. No. 3,967,872 varies from the above in that a cradle type grounding lug is secured between or intermediate adjacent projections 18 rather than at these projection locations themselves as would be done according to the earlier cited patents.

The number and location of ground wire connections is very important to the installer since the more ground wire connection points available, the less need there is for the installer to manipulate the bushing so as to make a connection point accessible. In the past, it was common for an installer to either un-tighten or over-tighten the bushing within the enclosure in order to align or get access to the connection point for the ground wire. Thus, it frequently occurred that an installer secured a ground wire to the connector, but the connector was not properly secured to the enclosure or the conduit. This, of course, is to be avoided at all costs!

It should also be noted that, as shown in the above identified patents, it is quite common to require the installer to insert the ground wire into a separate clip, lug or device and then require the installer to turn a screw so as to secure the ground wire within the clip. Hence, in these types of situation, two potentially limiting issues must be overcome by the installer. First, the screw must be accessible and at such an angle so that it can be torqued as needed against the ground wire. In the tight confines of an electrical enclosure, it is more often the case that such accessibility is not possible and hence to make it accessible, the conduit connector must be compromised such as by being loosened. Second, the separate clip can be readily lost or it can project so far as to interfere with an adjacent connector such that the clip cannot be employed. Unfortunately, these issues do not surface until the connector is actually installed as it is not possible to know beforehand whether there will be a conflict or not. Thus, there always exists the possibility when using these types of clip ground wire connectors, that the situation at the installation site is such that the connector cannot be employed, or if employed, will not be installed as specified by the manufacturer.

Further still, it is to be noted that many existing ground connectors are manufactured by casting. This is a costly and time-consuming manufacturing method and one that does not readily lend itself to streamlining or to large volumes. Thus, a simpler and quicker way to manufacture ground wire connectors is desirable.

There is therefore a need to be able to install a ground wire connector without regard to the final position or location of the ground wire connector component. It is also desired to be able to install the connector without incurring any interference with adjacent connectors. Yet another desirable feature is to be able to install the connector as tight as needed knowing that there is no potential need to 'back-off' or over-tighten the connector in order to properly align the connector with the ground wire. Still another desirable feature is to be able to install the connector without being concerned whether access to the ground wire component will be blocked or not. A further desire is to employ a connector that can be readily installed with a minimum number of parts so as to streamline the assembly and reduce the possibility of lost or dropped components. Yet another desirable feature is to be assured of a permanent and electrically continuous ground path between the conduit and the enclosure. Still another desirable feature is to be able to manufacture such a connector in a cost effective manner that readily lends itself to high volumes. These and other objects and advantages of this invention will be described in greater detail below.

SUMMARY OF THE INVENTION

A ground connector for grounding an electrical conduit includes a bushing having an outer wall and a plurality of ears integral with and extending from this outer wall. Each such ear is configured to define a ground wire receiving cavity. A separate locking member secured to the connector urges a ground wire into at least one of these ground wire receiving cavities.

The present invention provides for a ground connector for grounding an electrical conduit including a bushing and a locking nut. The bushing includes a top end, a bottom end, a side wall therebetween. The side wall has an outer wall and an inner wall, a plurality of ears integral with and extending generally radially from the outer wall, each of said ears configured to define a ground wire receiving cavity. The locking nut is configured for securement to the bushing for urging a ground wire into at least one of the ground wire receiving cavities.

The ground connector may include plurality of locking teeth extending from the outer wall, the locking teeth extending beyond the bottom end of the bushing, the locking teeth configured for engagement with an electrical enclosure. The teeth may be beveled to assist with engaging the bushing with the electrical enclosure.

The ground wire receiving cavity may be further defined by the outer wall and/or at least one of said ears is curved. The ears are configured with a first mating structure and the locking nut is configured with a second mating structure. Mating the first mating structure with the second mating structure enables the locking nut to urge the ground wire into the ground wire receiving cavity. Additionally, the locking nut may have a tear-shaped geometry corresponding with contours of the ground wire receiving cavity to assist in guiding and securing the ground wire within the ground wire receiving cavity.

The outer wall is partially threaded and the locking nut is matingly threaded. The locking nut urges the ground wire into at least one of the ground wire receiving cavity upon threading the locking nut with the outer wall.

Further, the inner wall may include a protruding stop to prevent a conduit from extending toward the top end of the bushing beyond the stop. The stop may be an inwardly extending rim of the side wall. The rim has a top surface which may be a curved smooth surface to prevent abrasion to conduit pulled therethrough.

The present invention provides for a ground connector for grounding an electrical conduit including a bushing having a top end, a bottom end, and a side wall therebetween. The side wall having an outer wall and an inner wall and is generally cylindrical in shape. The outer wall includes a plurality of ears and a plurality of locking teeth. The plurality of ears integral with and extending generally radially from the outer wall, each of the ears configured to define a ground wire receiving cavity. The plurality of locking teeth extend from the outer wall and extend beyond the bottom end of the bushing. The locking teeth are configured for engagement with an electrical enclosure. The inner wall includes an inwardly extending stop. The locking nut is configured for securement to the bushing. The locking nut includes ground wire lead-in geometry to urge a ground wire into at least one of the ground wire receiving cavities.

The present invention also provides for a ground connector for grounding an electrical conduit including a bushing comprising a top end, a bottom end, a side wall therebetween. The side wall has a partially threaded outer wall with a plurality of ears and a plurality of locking teeth. The plurality of ears are integral with and extending generally radially from the outer wall to define a ground wire receiving cavity. The plurality of locking teeth extend from the outer wall beyond the bottom end of the bushing. The side wall inwardly folds over itself to define an inwardly extending stop. The locking nut has interior threading to mate with the threading of the outer wall of the bushing. The locking nut includes ground wire lead-in geometry to urge a ground wire into at least one of the ground wire receiving cavities. The lead-in geometry corresponds with the contours of the ground wire receiving cavity.

DETAILED DESCRIPTION OF THE PREFERRED EMBODIMENT

Figure 6:
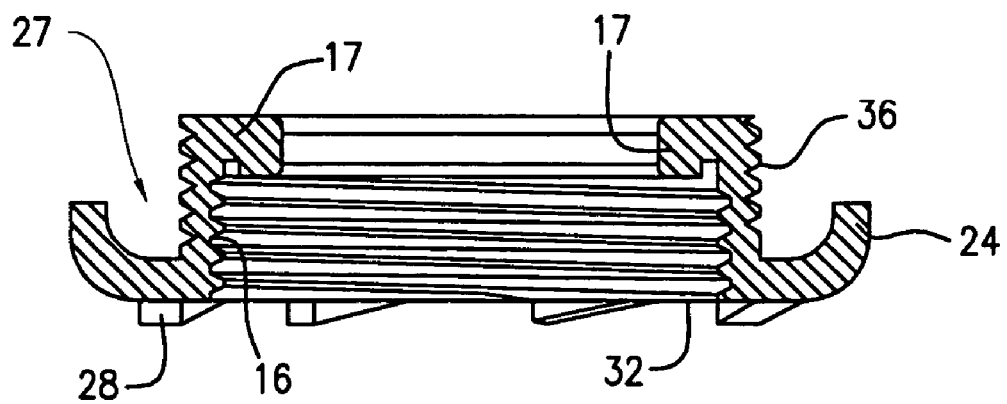
FIG. 6 is a section view of the invention of FIG. 5 taken along line B-B.

Referring initially to FIGS. 1-3, 9 and 10 there is shown ground wire connector 10 includes a grounding bushing portion 12 and ground wire locking nut portion 14. Bushing 12 and locking nut 14 are secured together by cooperative attachment between the external threads 36 of the bushing 12 and the internal threads 38 of the locking nut 14. Bushing 12 is also internally threaded 16 as shown in order to be secured to metal conduit 18 in the normal fashion for such a device. This manner of attachment requires a mating threaded end of metal conduit 18 to extend partially through an electrical enclosure 20 so that ground wire connector 10 can secure conduit 18 to the enclosure 20. The bushing 12 includes internal stop 17 which is a smooth curved protrusion within the bushing opposite the conduit 18 entry side as shown in FIG. 6. The internal threads 16 of the bushing 12 ends at the internal stop 17. The internal stop 17 serves a duel purpose. The internal stop 17 prevents the conduit 18 from extending through the brushing 12 beyond the internal stop 17, averting the conduit 18 from extending too far into the box. Additionally, the internal stop 17 provides a smooth curved surface to pull wires 18 through the box without damaging the wires by cutting or abrasion thereto.

Generally, a separate locking nut 22 would be secured to conduit 18 from one side of enclosure 20 (i.e. outside), and grounding bushing 12 is threaded onto conduit 18 at the other side (i.e. inside) which protrudes through the enclosure 20 up to the internal stop 17. This grounding bushing 12 and/or the separate locking nut 22 would then be tightened to compress enclosure 20 therebetween in the normal fashion.

Figure 4:
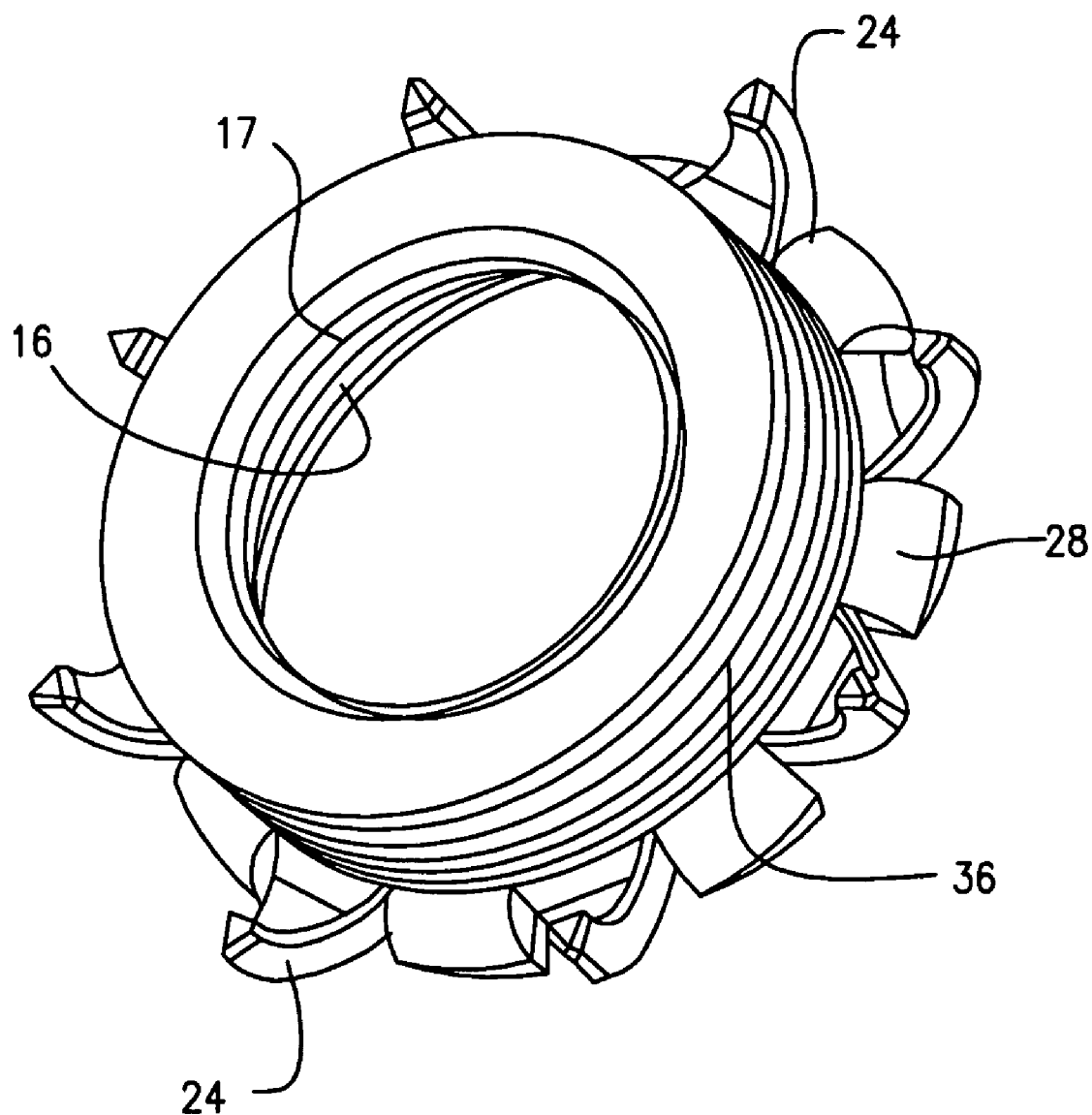
FIG. 4 is a perspective view of the bushing portion of the present invention.
Figure 5:
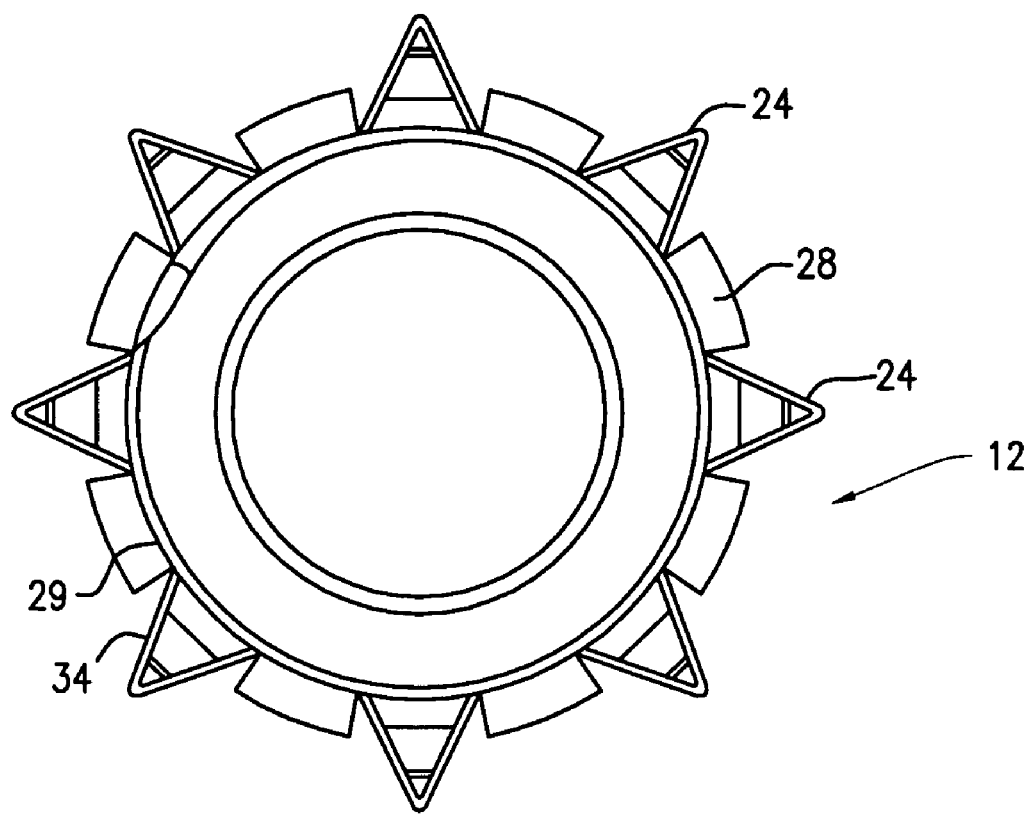
FIG. 5 is a top plan view of the invention of FIG. 4.

Most notable about grounding bushing 12 are the multitude of projecting ears 24 used as shown to secure a ground wire 26 to connector 10, as shown in FIGS. 4-6. Ears 24 are preferably curved upward away from the enclosure so as to readily accept a variety of differently sized ground wire 26 therein. Hence, ground wire receiving cavity 27 is defined by the curved portion of ears 24 and outer wall 29 of bushing 12. These ears 24 are also spaced about every 45 degrees along the perimeter of bushing 12. Of course, different spacings and different curvatures are equally likely, this arrangement merely being the preferred embodiment.

Figure 1:
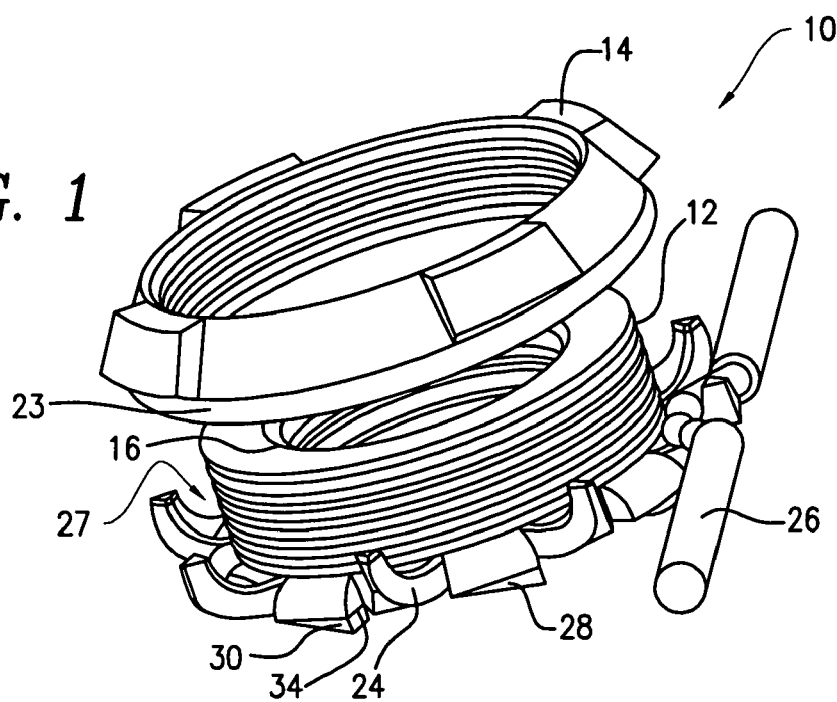
FIG. 1 is a perspective view of the present invention.
Figure 2:
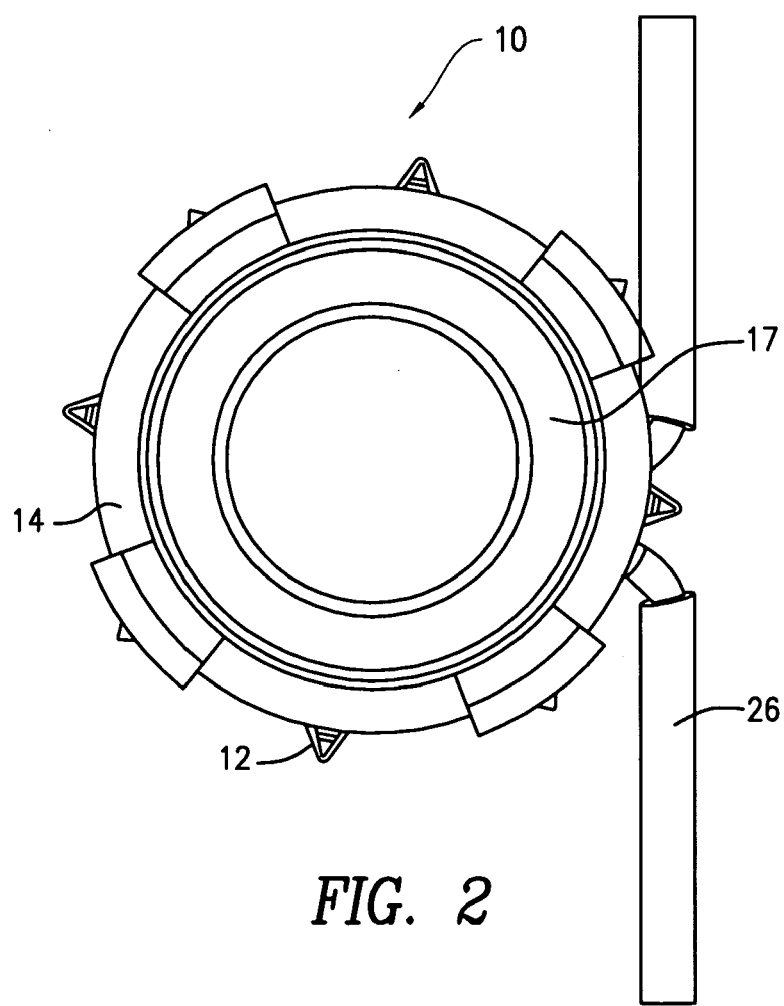
FIG. 2 is a top view of the invention of FIG. 1.
Figure 3:
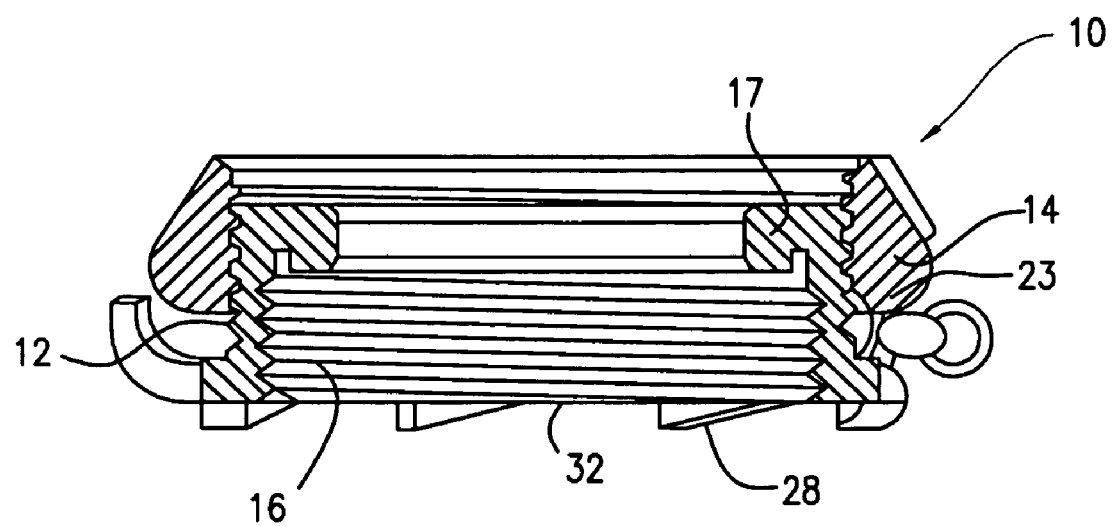
FIG. 3 is a section view of the invention of FIG. 2 along the line A-A.

Intermediate a few of these ears 24 are locking teeth 28. These locking teeth 28 also extend outward from outer wall 29 of bushing 12, but they are curved or directed downwardly in a direction opposite ears 24. Locking teeth 28 preferably terminate at an edge, point or bevel 30 so as to be able to dig into enclosure 20. As shown in FIGS. 1 and 3, these teeth 28 project or extend just slightly below the bottom 32 of bushing 12 so as to better engage with the surface of the enclosure 20 and complete a ground connection therewith. Hence, when enclosure 20 is compressed between bushing 12 and separate locking nut 22, teeth 28 of bushing 12 dig into enclosure 20 from one side as separate locking nut 22 is tightened onto conduit 18 from the other side. This provides extra assurance that connector 10 is and will remain properly secured to enclosure 20.

By incorporating bushing 12 with such teeth 28, connector 10 is able to eliminate one common components of prior art connectors, namely the internal and/or external locknuts. Thus, this design of connector 10 is now of fewer components and thus is less costly to manufacture and requires one less part to be assembled thereby improving installation time.

It should also be noted that sides 34 of teeth 28 can be configured to extend radially from bushing 12 in a generally perpendicular direction so as to create a corner between sides 34 and outer wall 29 of bushing 12, as shown in FIG. 5. This now permits an installer to apply a tool in the corner created and use that tool as a driver to more forcibly torque bushing 12 against enclosure 20 (or to release or un-thread bushing 12 from conduit 18). Alternatively, it is conceivable for portions of ears 24 to be likewise configured to create such a corner for the insertion of a driver so that the installer now has many more options to choose from.

Figure 7:
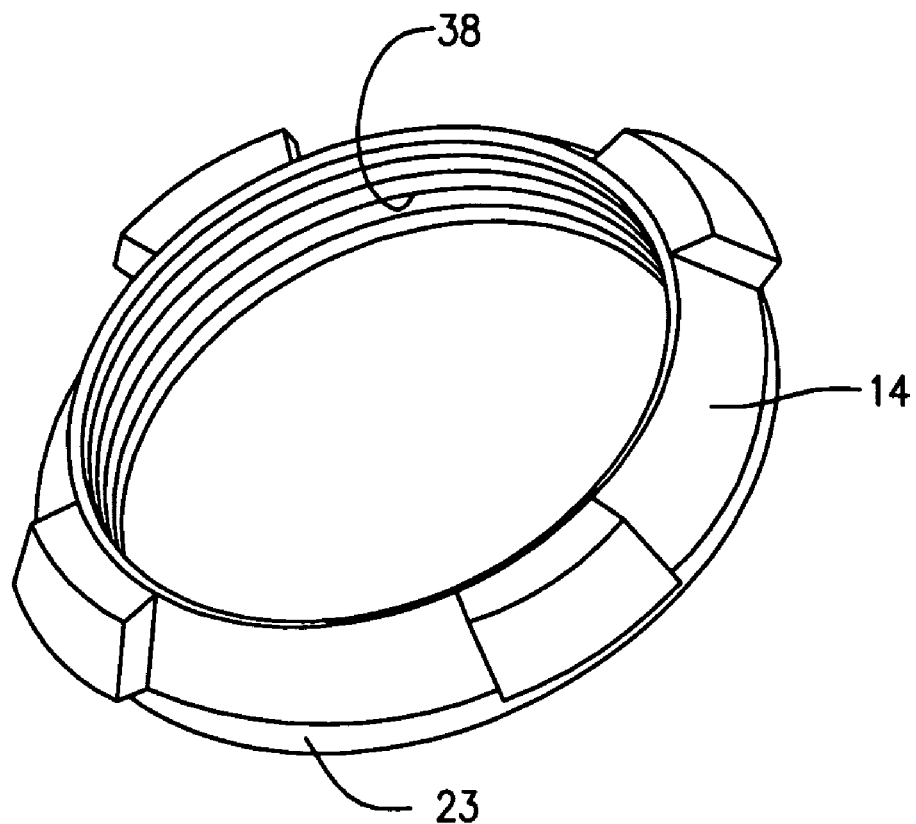
FIG. 7 is a top perspective view of the locking nut portion of the present invention.
Figure 8:
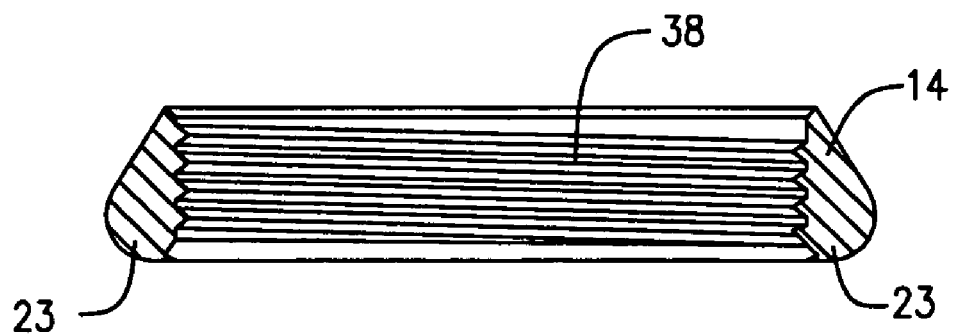
FIG. 8 is a section view of the invention of FIG. 7.
Figure 9:
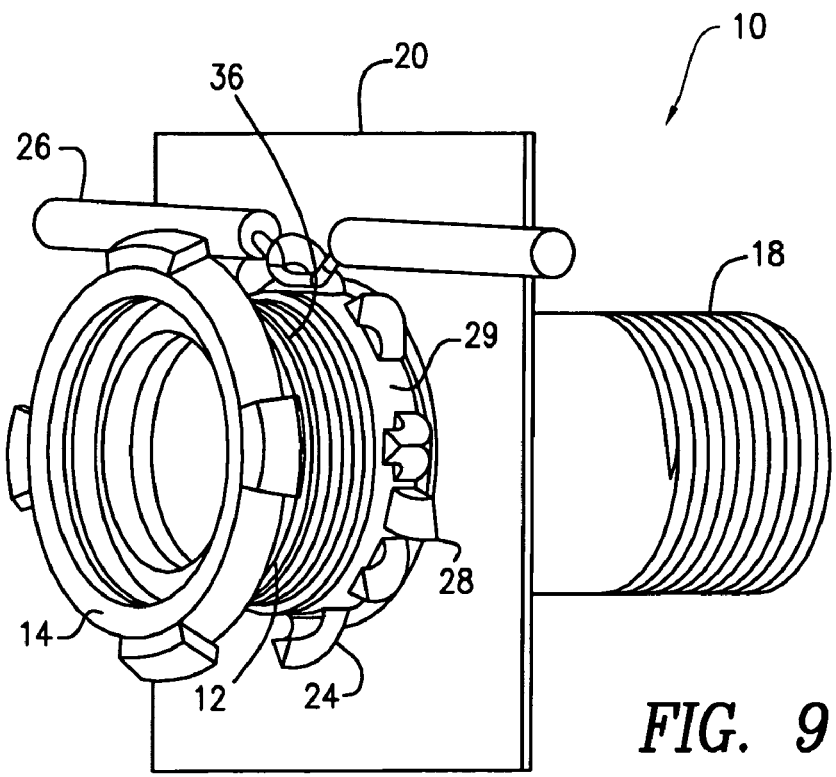
FIG. 9 is a front exploded perspective view of the present invention assembled onto a conduit and secured to a load center.
Figure 10:
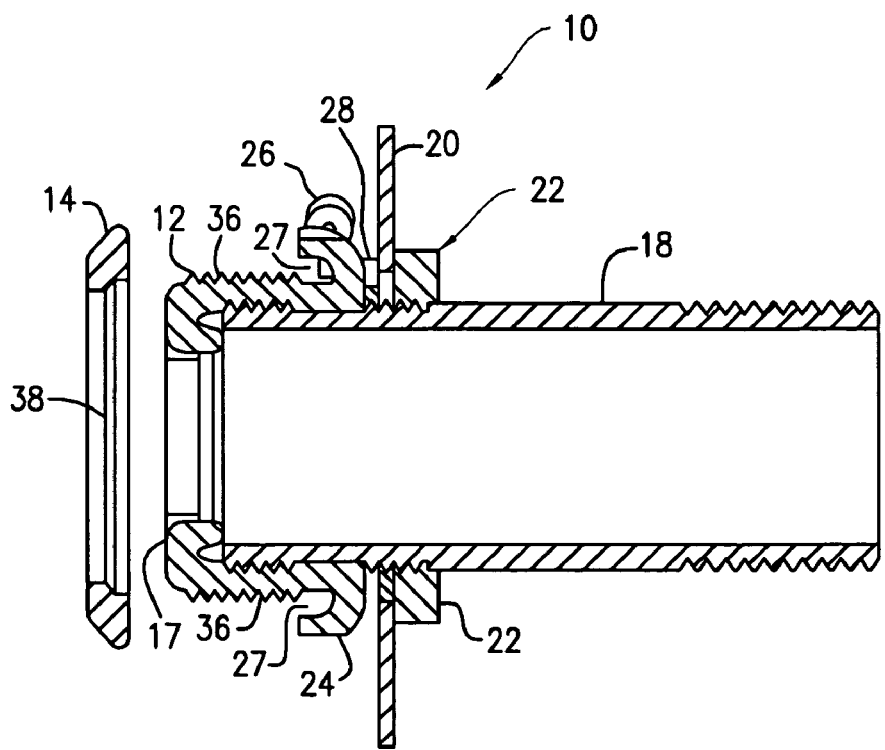
FIG. 10 is an exploded sectional view of the invention shown in FIG. 9.

To retain ground wire 26 within ground wire receiving cavity 27 and against the curvature of ears 24, ground wire locking nut 14 is threaded onto bushing 12. These external threads 36 on bushing 12 are better shown in FIGS. 1, 4, and 6 and they mate with internal threads 38 along the interior surface of locking nut 14. Locking nut 14 includes protrusion 15 which are used to secure or tighten the locking nut 14 onto the bushing 12. FIGS. 7 and 8 show locking nut 14 shaped with a tear-drop lower portion 23 to mate with the ground wire receiving cavity 27. The lower portion 23 of the locking nut 14 assists in securing ground wires 26 within the ground wire receiving cavity 27. FIG. 3 shows locking nut 14 threaded on bushing 12 maintaining ground wire 26 within ground wire receiving cavity 27 and securely against the curvature of ears 24 so as to provide permanent and continuous electrical contact with the ground wire 26. Preferably, locking nut 14 is made of metal, similar to that of bushing 12, but it is also conceivable for locking nut 14 to be made of other material, such as an insulating material, so long as it is capable of retaining ground wire 26 against ears 24 for electrical connectivity.

As indicated earlier, the curvature of ears 24 is such that a variety of differently sized ground wires 26 can be inserted within ground wire receiving cavity 27. FIG. 1 shows one size ground wire 26 secured against an ear 24 but other larger sized ground wire may be mounted against ears 24 and locking nut 14. Of course, the smaller the size ground wire, the more that locking ring 14 may be threaded onto busing 12.

No matter the ground wire 26 size, however, electrical contact is now made between the ground wire 26 and ground wire receiving cavity 29 and in particular the inside curved surface of ears 24 as well as the sides of bushing 12 in addition to locking nut 14 (provided locking nut 14 is made of a conducting material). Hence, all sides of the ground wire 26 are now in electrical contact with connector 10 and not just its opposite sides as is the case in the prior art where the ground wire is pressed between a screw and an opposite seat. Thus, greater electrical contact with ground wire 26 is now possible.

Another unique feature of connector 10 is that is can be manufactured by a stamping operation, it need not be cast. Such a stamping operation is quicker to accomplish and can accommodate the manufacture of many more such connectors 10 in the same amount of time. Such a manner of construction also lends itself to a greater degree of automation. Thus, this design provides not only for better electrical contact with the ground wire and employs fewer parts, it is also easier and cheaper to manufacture.

To install connector 10, a user would first separately thread locknut 22 or apply another stop onto the end of conduit 18 in the normal fashion and as is quite common in the industry. The projecting conduit end would then be inserted through an opening in electrical enclosure 20 as is also typical. From the inside of enclosure 20, the installer would then thread bushing 12 onto the end of conduit 18 until the conduit abuts the internal stop 17 of bushing 12. The separate locking nut 22 is then adjusted or tightened to remove any slack in the conduit between the bushing 12 and the locking nut 22 to allow the bushing 12 to tighten securely against enclosure 20. To insure a secure installation, the installer oftentimes places a driver against an ear 24 or a tooth 28 and then applies more force, such as by hammering, to tightly compress enclosure 20 between bushing 12 and outside locknut 22. Teeth 28, which extend slightly below the bottom 32 of bushing 12, would now dig into enclosure 20 and resist any un-tightening as well as make a ground connection between bushing 12 and enclosure 20. The same can be said for any locknut 22 that may be configured with like teeth located on the outside of enclosure 20.

The user is now presented with numerous locations or ground wire receiving cavities 27 into which ground wire 26 may be placed. Since there are no set screws or separate clips to be employed in tightening the ground wire 26 against bushing 12, the only concern of the installer is which cavity 27 the stripped ground wire 26 is to be placed. Obviously, ground wire 26 can be readily bent or deformed to accommodate one or more ear 24 on bushing 12. Thus, under this arrangement, there is no need for the installer to be concerned with clearances or accessibility for a later screw or driver since these issues which occurred frequently in the prior art no longer apply with connector 10.

Once ground wire 26 is placed within one (or even more than one) cavity 27, locking nut 14 is threaded onto bushing 12 to thereby trap and hence secure ground wire 26 in place. The tear-shaped portion 23 of the locking nut 14 assist in securing the ground wire 26 by sandwiching it between the ears 24 and the locking nut 14, within the ground wire receiving cavity 27. Locking nut 14 also biases ground wire 26 against ears 24 so as to insure electrical conductivity between the ground wire 26 and connector 10 and ultimately with enclosure 20.

While select preferred embodiments of this invention have been illustrated, many modifications may occur to those skilled in the art and therefore it is to be understood that these modifications are incorporated within these embodiments as fully as if they were fully illustrated and described herein.

What is claimed is:

1. A ground connector for grounding an electrical conduit comprising:
   (a) a bushing comprising a top end, a bottom end, a side wall therebetween, said side wall having an outer wall and an inner wall, said outer wall having a plurality of ears extending generally radially therefrom, each of said ears configured to define a ground wire receiving cavity; and, (b) a locking nut configured for securement to the bushing for urging a ground wire into at least one of said ground wire receiving cavities.

2. The ground connector as set forth in claim 1 wherein said ground wire receiving cavity is further defined by said outer wall.

3. The ground connector as set forth in claim 1 wherein at least one of said ears is curved.

4. The ground connector as set forth in claim 1 wherein said outer wall is partially threaded and said locking nut is matingly threaded, said locking nut urges said ground wire into at least one of said ground wire receiving cavities upon threading said locking nut with said outer wall.

5. The ground connector as set forth in claim 1 wherein said ears are configured with a first mating structure and said locking nut is configured with a second mating structure wherein mating said first mating structure with said second mating structure enables said locking nut to urge said ground wire into said ground wire receiving cavity.

6. The ground connector as set forth in claim 1 wherein said locking nut has a tear-shaped geometry corresponding with contours of said ground wire receiving cavity to assist in guiding and securing said ground wire within said ground wire receiving cavity.

7. The ground connector as set forth in claim 1 further comprising a plurality of locking teeth extending from said outer wall, said locking teeth extending beyond said bottom end of said bushing, said locking teeth configured for engagement with an electrical enclosure.

8. The ground connector as set forth in claim 7 wherein said teeth of said bushing are beveled to assist with engaging said bushing with said electrical enclosure.

9. The ground connector as set forth in claim 1 wherein said inner wall includes a protruding stop to prevent a conduit from extending toward said top end of said bushing beyond said stop.

10. The ground connector as set forth in claim 9 wherein said stop is an inwardly extending rim of said side wall.

11. The ground connector as set forth in claim 9 wherein said rim has a top surface, said top surface is a curved smooth surface to prevent abrasion to conduit pulled therethrough.

12. A ground connector for grounding an electrical conduit comprising:

(a) a bushing comprising a top end, a bottom end, a side wall therebetween, said side wall having an outer wall and an inner wall, said outer wall includes a plurality of ears and a plurality of locking teeth, said plurality of ears integral with and extending generally radially from said outer wall, each of said ears configured to define a ground wire receiving cavity, said plurality of locking teeth extending from said outer wall, said locking teeth extending beyond said bottom end of said bushing, said locking teeth configured for engagement with an electrical enclosure, said inner wall includes an inwardly extending stop; and (b) a locking nut configured for securement to said bushing, said locking nut includes ground wire lead-in geometry to urge a ground wire into at least one of said ground wire receiving cavities.

13. The ground connector as set forth in claim 12 wherein said ground wire receiving cavity is further defined by said outer wall.

14. The ground connector as set forth in claim 12 wherein at least one of said ears is curved.

15. The ground connector as set forth in claim 14 wherein said outer wall is partially threaded and said locking nut is matingly threaded, said locking nut threads onto said outer wall to urge said ground wire into at least one of said ground wire receiving cavities.

16. The ground connector as set forth in claim 12 wherein said ears are configured with a first mating structure and said locking nut is configured with a second mating structure wherein mating said first mating structure with said second mating structure enables said locking nut to urge said ground wire into a said ground wire receiving cavity.

17. The ground connector as set forth in claim 16 wherein said second mating structure is a tear-shaped geometry corresponding with contours of said first mating structure of said ground wire receiving cavity to assist in guiding and securing said ground wire within said ground wire receiving cavity.

18. The ground connector as set forth in claim 17 wherein said stop has a top surface, said top surface is a curved smooth surface to prevent abrasion to conduit pulled therethrough.

19. The ground connector as set forth in claim 18 wherein said teeth of said bushing are beveled to assist with engaging said bushing with said electrical enclosure.

20. A ground connector for grounding an electrical conduit comprising:

(a) a bushing comprising a top end, a bottom end, a side wall therebetween, said side wall having a partially threaded outer wall, said outer wall includes a plurality of ears and a plurality of locking teeth, said plurality of ears integral with and extending generally radially from said outer wall to define a ground wire receiving cavity, said plurality of locking teeth extend from said outer wall beyond said bottom end of said bushing, said side wall inwardly folds over itself to define an inwardly extending stop; and (b) a locking nut having interior threading to mate with said outer wall of said bushing, said locking nut includes ground wire lead-in geometry to urge a ground wire into at least one of said ground wire receiving cavities, said lead-in geometry corresponds with contours of said ground wire receiving cavity.

* * * * *